United States Patent
Arunachalam et al.

(10) Patent No.: US 10,296,990 B2
(45) Date of Patent: May 21, 2019

(54) VERIFYING COMPLIANCE OF A LAND PARCEL TO AN APPROVED USAGE

(71) Applicant: International Business Machines Corporation, Armonk, NY (US)

(72) Inventors: Ravi S. Arunachalam, Bangalore (IN); Navjot S. Bhogal, Bangalore (IN); Chandan Mukherjee, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1308 days.

(21) Appl. No.: 13/923,508

(22) Filed: Jun. 21, 2013

(65) Prior Publication Data
US 2014/0379748 A1 Dec. 25, 2014

(51) Int. Cl.
*G06Q 50/16* (2012.01)
*G06Q 10/10* (2012.01)

(52) U.S. Cl.
CPC ............ *G06Q 50/16* (2013.01); *G06Q 10/10* (2013.01)

(58) Field of Classification Search
CPC .......................... G06F 17/30241; G06Q 50/16
See application file for complete search history.

(56) References Cited

U.S. PATENT DOCUMENTS

| | | | |
|---|---|---|---|
| 6,606,304 B1 | 8/2003 | Grinter et al. | |
| 7,710,452 B1 | 5/2010 | Lindberg | |
| 7,873,524 B2 | 1/2011 | Wenzlau et al. | |
| 7,890,509 B1 * | 2/2011 | Pearcy et al. | 707/736 |
| 2002/0178097 A1 * | 11/2002 | Snow | 705/35 |
| 2006/0116952 A1 * | 6/2006 | Orfano | G06Q 20/10 705/38 |
| 2008/0306973 A1 * | 12/2008 | Richard | 707/100 |
| 2010/0057538 A1 * | 3/2010 | Hardman | G06Q 40/06 705/313 |
| 2012/0066187 A1 * | 3/2012 | Pearcy et al. | 707/692 |
| 2013/0241698 A1 * | 9/2013 | Rasmussen | G06K 19/0716 340/10.1 |
| 2013/0262530 A1 * | 10/2013 | Collins et al. | 707/812 |
| 2014/0214472 A1 * | 7/2014 | Sewell et al. | 705/7.23 |
| 2014/0324630 A1 * | 10/2014 | Golden et al. | 705/26.61 |

(Continued)

OTHER PUBLICATIONS

"Appnions Awarded Patent for Methodology for Opinions (and Sentiment) Analysis", Andrey Golub, Sep. 10, 2012, http://www.snid.eu/2012/09/appinions-awarded-patent-for-methodology-for-opinion-and-sentiment-analysis/.

(Continued)

*Primary Examiner* — Mohammad S Rostami
(74) *Attorney, Agent, or Firm* — Schmeiser, Olsen & Watts, LLP; Mark Vallone (57) ABSTRACT

A computer implemented method, system and a computer program product for verifying compliance of a land parcel to an approved usage includes monitoring one or more updatable sources of information to detect availability of new information with respect to the land parcel, processing the new information to determine location information and current usage of the land parcel, querying a database storing location information of land parcels having at least approved usage information to determine approved usage of the land parcel. Finally, the current and approved usages of the land parcel are compared to determine compliance of the current usage to the approved usage of the land parcel.

21 Claims, 3 Drawing Sheets

(56) References Cited

U.S. PATENT DOCUMENTS

2014/0330664 A1* 11/2014 Lisitza .................. G06Q 30/08
705/26.3

OTHER PUBLICATIONS

Features and Benefits, IBM InfoSphere BigInsights, http://www-01.ibm.com/software/data/infosphere/biginsights/features.html, copyright IBM Corporation 1994, 2013.
Patricia E. Salkin, "Social Networking and Land Use Planning and Regulation: Practical Benefits, Pitfalls, and Ethical Considerations", Mar. 9, 2011, Pace Law Review, vol. 31, Issue 1 Social Networking and the Law, Winter 2011.

* cited by examiner

VERIFYING COMPLIANCE OF A LAND PARCEL TO AN APPROVED USAGE

FIELD OF THE INVENTION

The present invention generally relates to verifying compliance of a land parcel to an approved usage, and more particularly, to a method, system and computer program product for gathering location information and current usage of a land parcel from user updatable sources such as online social networking mediums and verifying whether the current usage of land is in compliance with the approved usage of the land.

BACKGROUND

Generally, before a land parcel is used for any specific purpose such as residential or commercial, appropriate approvals are required to be sought and obtained from competent local Government bodies. The usage of the land parcel is to be limited to the approval granted by the local Government body and any non-compliance therein may result in punitive action as per the law of the land.

Property tax is a major source of revenue for local Government bodies. Tax rates are usually linked to the type of usage. Generally, residential usage of a land parcel attracts lower tax rates as compared to commercial usage. It is quite possible that a land parcel approved for residential usage is ultimately used for commercial purposes. Thus, land usage regulation from the local Government body point of view in the context of revenue collection is of paramount importance. Enforcement of approved usage of land parcel and fraud detection in this regard is a key concern of the local Government Bodies. Efficient enforcement of approved land usage is difficult and requires an army of land inspectors which is generally not feasible. Thus, there is a need to explore technological means for enforcing approved land usage and detecting non-compliance in this regard.

SUMMARY

A method, system and computer program product for verifying compliance of a land parcel to an approved usage is disclosed and claimed herein. Exemplary embodiments may comprise monitoring one or more updatable sources of information to detect availability of new information with respect to the land parcel, processing the new information to determine location information and current usage of the land parcel, querying a database storing location information of land parcels having at least approved usage information to determine approved usage of the land parcel and comparing the current usage and approved usage of the land parcel to determine compliance of the current usage to the approved usage of the land parcel.

According to embodiments, the updatable sources of information include internet based social networking tools, digital maps, or land related databases.

According to embodiments, the detection of new information may be based on one or more pre-defined parameters such as the presence of a pre-determined keyword in the new information or a type of the new information such as text, photo or video.

According to embodiments, if the new information is textual, processing of the new information includes performing a textual analysis of the new information to determine location information and current usage of the land parcel.

According to embodiments, if the new information is a photograph, processing of the new information to determine location information of the land parcel includes at least one of the following: extracting meta data information of the photograph to identify the land parcel in the photograph and the location information thereof, performing textual analysis of the user comments with respect to the photograph to identify the land parcel in the photograph.

According to embodiments, if the new information is a photograph, processing of the new information to determine currant usage of the land parcel includes performing textual analysis of user comments with respect to the photograph by scanning activity related key words.

According to embodiments, querying the database includes converting the location information and current usage of the land parcel into a pre-determined compatible format to enable querying the land database.

The comparison, according to the embodiments, includes comparing the current and approved usage of the land parcel to generate a compliance score and in response to the compliance score exceeding a pre-defined threshold score, determining a deviation of the current usage from the approved usage of the land parcel.

DETAILED DESCRIPTION

As will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, microcode, etc.) or an embodiment combining software and hardware embodiments that may all generally be referred to herein as a "circuit," "module" or "system". Furthermore, embodiments of the present invention may take the form of a computer program product, embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
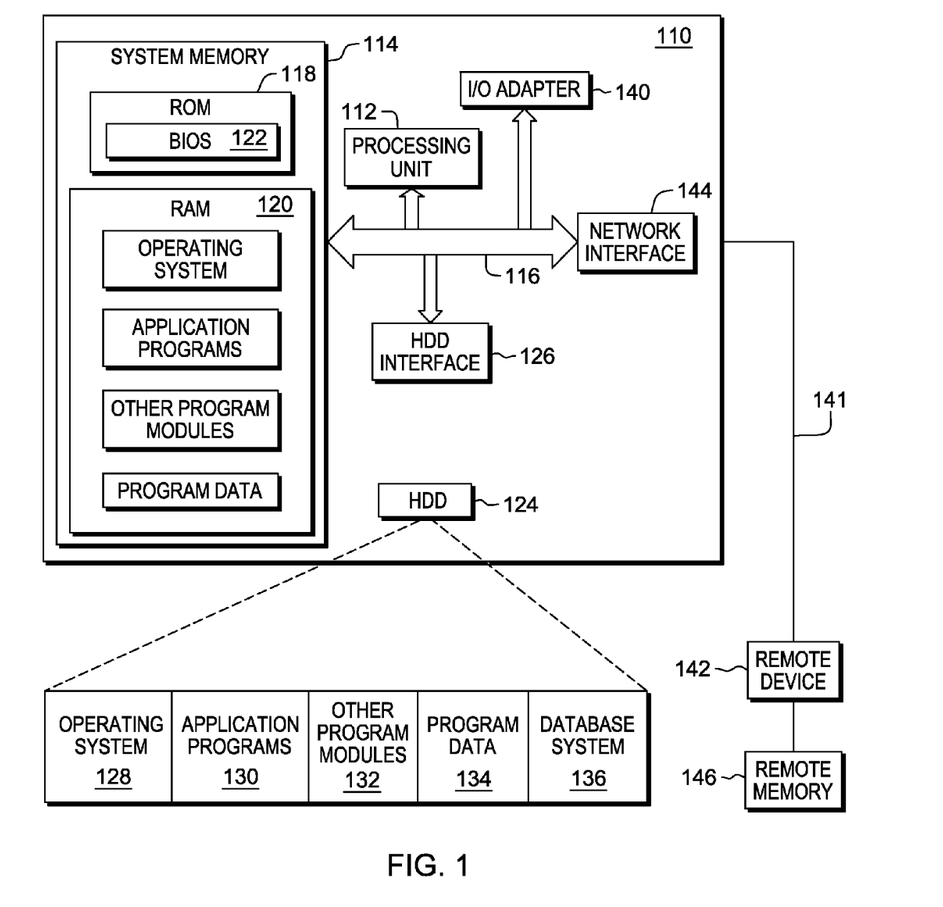
FIG. 1 illustrates a block diagram of a computing system for implementing an embodiment of the present invention.

FIG. 1 illustrates a block diagram of a computing system for implementing an embodiment of the present invention. The computing system includes a computing device 110, which in turn includes a processing unit 112, a system memory 114, and a system bus 116 that couples various system components including the system memory 114 to the processing unit 112. The system bus 116 may be any of several types of bus architectures, including a memory bus, a memory controller, a peripheral bus, and a local bus using any of a variety of bus architectures, such as PCI. The system memory 114 includes a Read Only Memory (ROM) 118 and a Random Access Memory (RAM) 120. A Basic Input/Output System (BIOS) 122, containing the basic routines that help to transfer information between elements within the computing device 110, such as during start-up, is stored in the ROM 118. The computing device 110 further includes a Hard Disk Drive (HDD) 124 as computer-readable storage media. The HDD 124 is connected to the system bus 116 by an HDD interface 126. The HDD 124 provides a non-volatile storage for computer-readable instructions, data structures, program modules, and other data for the computing device 110. Although the exemplary environment described herein employs the HDD 124, it should be appreciated by those skilled in the art that other types of computer-readable storage media, which can store data accessible by computer, such as RAM, ROM, removable magnetic disks, removable optical disks, and the like may also be used in the exemplary operating environment.

A number of program modules may be stored on the HDD 124, including an operating system 128, one or more application programs 130, other program modules 132, program data 134, and a database system 136. The operating system 128, the one or more application programs 130, the other program modules 132 and program data 134 may be loaded onto the system memory 114 and specifically onto the RAM 120 during the functioning of the computing device 110. A user may provide commands and information through input devices, such as a keyboard, and receive output through peripheral output devices, such as monitor, speaker, printer, etc. These input and output devices are often connected to the processing unit 112 through an I/O adapter 140 coupled to the system bus 116.

In a networked environment, the computing device 110 may be connected to a remote computing device 142 through a network interface card 144. It will be appreciated that the network connections shown are exemplary, and any conventional means 141 of establishing communications links between the computers, such as a local area network, wide are network or wireless connection, may be used. In a networked environment, program modules depicted relative to the computing device 110, or its components, may be stored in a remote memory 146. The remote computing device 142 may be a personal computer, a router, a server, a network PC, a peer device, or other common network device.

Those of the ordinary skill in the art will appreciate that the hardware in FIG. 1 is a basic computing system and may vary. The architecture of the aforementioned computing device is not limiting and is only depicted as an example on which an embodiment of the present invention may be implemented. Other types of computing system such as a smart phone or a web-kiosk are well within the intended scope on which an embodiment of the present invention may be implemented.

Figure 2:
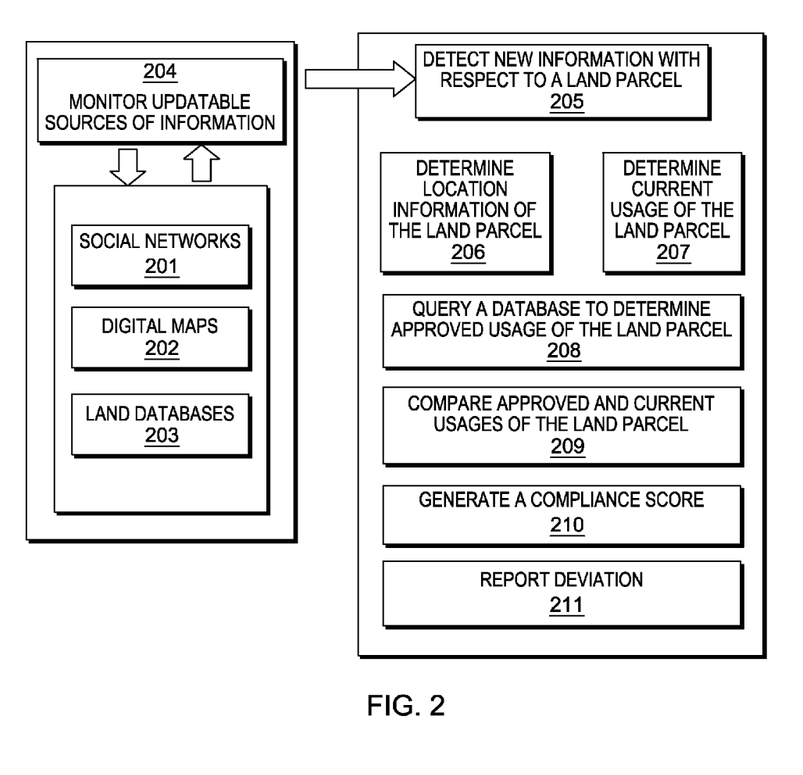
FIG. 2 illustrates a functional block diagram of a system for implementing an embodiment of the present invention.

FIG. 2 illustrates a functional block diagram of a system for implementing an embodiment of the present invention. According to the system, updatable sources of information such as internet based social networking tools 201, digital maps 202, land related databases 203 such as yellow pages or classified listings (for sale, rental) are monitored 204 to detect any new information with respect to a land parcel 205. Monitoring includes crawling and analyzing the aforementioned sources of information through various crawling and analyzing softwares available in the market well known to a person skilled in the art. The land parcel includes land of any size along with any infrastructure thereon such as buildings used for any purpose such as residential or commercial.

The detection of new information with respect to the land parcel as a result of aforementioned monitoring may be based on pre-defined parameters selected from one of the following: the presence of a pre-determined key word, and a type of information such as text, photo or video. For example, if the information (in updatable sources of information) is a text containing words such as restaurant, bar, pub or any reference to a land parcel, such information may be designated as new information with respect to a land parcel. If the information is non-textual and in multimedia format such as video, photograph or slide shows, it may be ignored. However, comments posted with respect to the multimedia information may be monitored as described above for presence of certain keywords to help classify whether the multimedia information can be designated as new information with respect to a land parcel. The aforementioned example are only for illustration purposes and there may be many possible permutations and combinations for determining information as new information. The detection of new information as described above may be performed by algorithms available in the market or well known to the person skilled in the art. Usually, such algorithms are a part of the crawling softwares as described above and there may be required certain fine tuning of the crawling softwares to configure the pre-defined parameters for detecting new information therein.

Next, the new information with respect to a land parcel is processed by means of algorithms to determine the location information of the land 206. The algorithm for determination of location information of land may vary with the type of new information such as text, photo or video. For example, if the type of new information is textual, textual analysis thereof is performed by algorithms available in the market or well known to a person skilled in the art to determine the location information of the land. For example, in social networking tools, the user may post new information regarding a recent visit to a place with address or zip code or name of the place visited. Such information may be analyzed to determine the location information of the land parcel. According to a preferred embodiment, the algorithm may be configured to seek, search or harvest location information of the land using keywords in the text of new information or to analyze new information or combination thereof in publicly available databases such as yellow pages or search engines such as Google®, Bing® etc. If the type of new information in a social networking tool is a photograph along with comments with respect to the photograph posted by users of the social networking tool, the algorithm may be configured to extract metadata information of the photograph to determine the geo-tagged content of the photograph. The geo-tagged content such as (date, time and place where the photograph was taken) may be further analyzed to determine the location information of the land parcel. The user comments with respect to the photograph may also be analyzed as described above for determining location information of the land parcel. If the location information of the land parcel determined from a photograph and user comments thereof differ, further analysis or comparison of the location information may be performed to determine the extent of difference. If the location information shows no similarity or are significantly different, the algorithm may be configured to perform a pre-determined function such as treating each location information as unique with respect to two land parcels and proceed with each location information separately as described below or give the user a choice to retain one of the location information for further processing. The above example for determining the location information of the land is depicted for illustrative purposes only and there may be possible different means and ways for determining the location information of the land parcel.

Next, the system determines current usage of the land parcel 207 by processing the new information through algorithms well known to persons skilled in the art or available in the market. The algorithm for determining current usage of the land parcel may vary with each type of new information such as text, photo or video or a combination of the three. For example, if the type of new information with respect to the land parcel is textual, textual analysis thereof is performed by algorithms available in the market or well known to a person skilled in the art to determine the current usage of the land parcel. For example, in social networking tools, the user may post information regarding a recent visit to a place with address or zip code or name of the place visited along with some activity related keywords such as restaurant, dining, clubbing etc. Such information may be analyzed to determine the current usage of the land parcel. According to a preferred embodiment, the algorithm may be configured to seek, search or harvest current usage information of the land using keywords in the text of new information or analyze new information or combination thereof in publicly available databases such as yellow pages or search engines such as Google®, Bing® etc. Further, the determined location information of the land parcel may also be used to determine the current usage information of the land parcel. For example, the determined location information of the land parcel may be searched in publicly available databases such as Yellow pages of Search Engines such Google®, Bing® etc. The search result may be further analyzed for presence of any activity related keywords such as dining, eating, restaurant, drinks etc to determine the current usage of the land parcel. The above example for determining the current usage information of the land parcel is depicted for illustrative purposes only and there may be possible different means and ways for determining the current usage of the land parcel.

According to a preferred embodiment, the determination of the current usage of the land parcel may be assigned a confidence score by the system. The confidence score may be assigned based on a quantum of conflict in the results obtained by processing each new information differently or by means of different algorithms. For example, if the new information is textual and processing thereof leads to a result that the current usage of the land is a restaurant whereas upon searching the determined location information in publicly available databases or processing the photo or video information leads to a result that the current usage of the land parcel is not a restaurant but is a residential complex, the confidence score assigned may be low. However, manually, upon verification by a user, the confidence score may be changed to the user's discretion.

According to a preferred embodiment, the location information and current usage of the land parcel are converted into a pre-determined compatible format to enable querying a database of land parcels. The database contains location information of land parcels and their approved usage information. The database may also contain other information regarding the land parcels. Many different types of data format conversion algorithms are available in the market and its choice depends entirely on the data format of the database.

After the data format conversion or when the data with respect to location information of the land parcel is in a compatible format with respect to the database, the database is queried with the location information of the land parcel to determine an approved usage of the land parcel 208. The land database systems and that of the present invention may be different systems requiring networking means to interface them to enable communication with each other. Networking of systems is a well known art and can be implemented by a person skilled in the art. Upon querying, the database returns a result listing the approved usage of the land parcel.

According to a preferred embodiment, the approved usage of the land parcel from the database is imported into the system of the present invention and compared with the approved and current usages of the land parcel 209. A compliance score 210 is subsequently generated based on the comparison indicative of an extent of deviation of current usage to the approved usage of the land parcel. The compliance score, according to a preferred embodiment, may be based on deviation of the usage of the land parcel, confidence score of current usage of the land parcel, proximity of the activity cluster center, high volume of activities, temporal variation in activity volume, diversity of users generating content etc. For example, if the approved usage of the land parcel is 'residential' and the current usage of the land parcel is determined to be 'restaurant', the compliance score assigned may be zero. This score is subject to other variables as above. For example, if the confidence score of the current usage of the land parcel is low, the compliance score may correspondingly increase. However, if the volume of activities being generated by users is high, i.e., a high number of new information is detected and processed to determine that the current usage of the land parcel is restaurant, the compliance score may correspondingly decrease. Thus, the compliance score may subjected to a matrix of pre-defined variables. A deviation exceeding a pre-defined threshold, say a compliance score of zero may trigger an alarm or notification to the relevant authority 211 enabling possible relevant action. The algorithms for importing the approved usage information of the land parcel from the database, comparing the approved and current usages of the land, generating compliance score and triggering an alarm or notification are a known art and can be implemented by persons skilled in the art.

Figure 3:
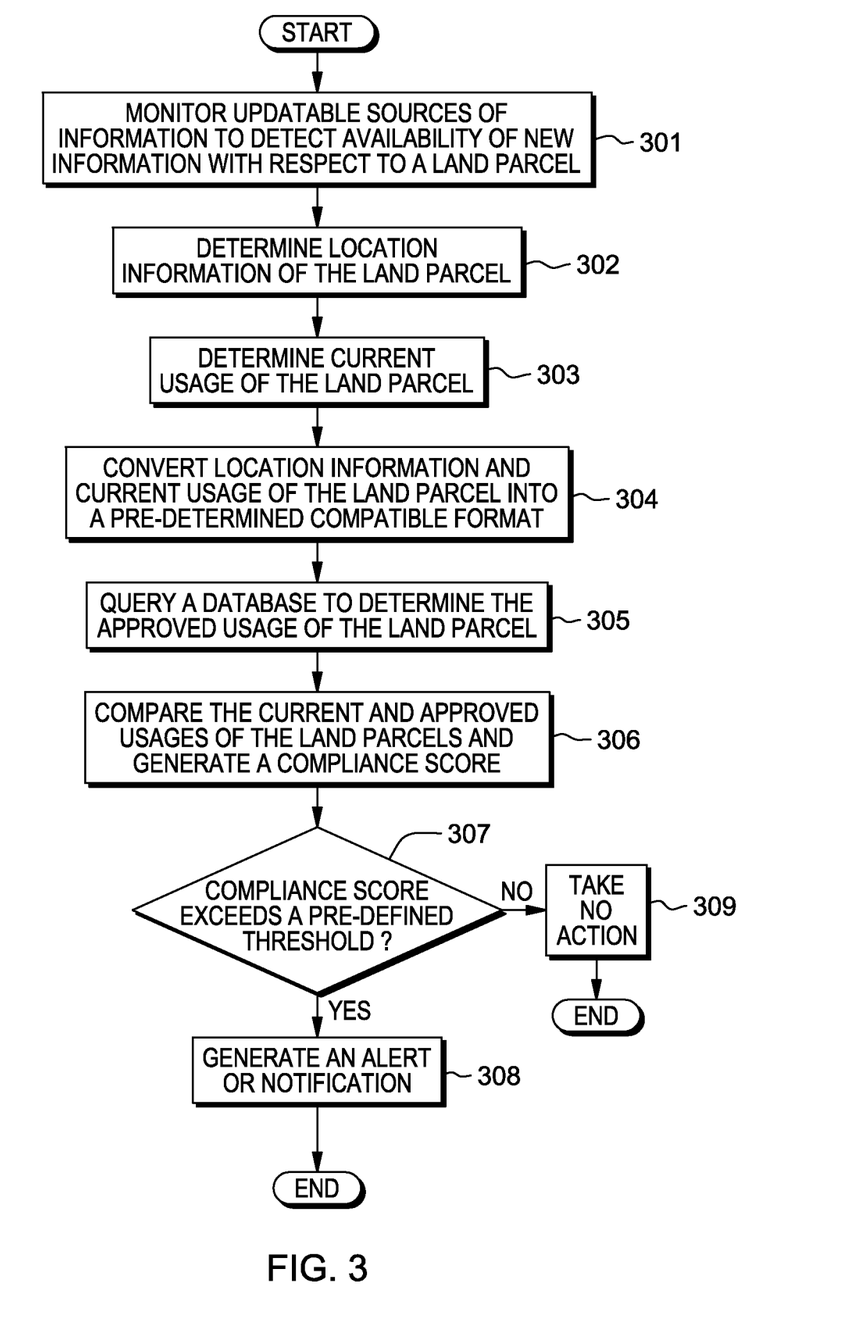
FIG. 3 illustrates a flowchart depicting steps to be performed for implementing an embodiment of the present invention.

FIG. 3 illustrates a flowchart depicting steps to be performed for implementing an embodiment of the present invention.

At step 301, updatable sources of information, such as internet based social networking tools, digital maps, land related databases such as yellow pages or classified listings (for sale, rental), are monitored to detect availability of new information with respect to a land parcel. Monitoring includes crawling and analyzing the aforementioned sources of information through various crawling and analyzing softwares available in the market well known to a person skilled in the art. The land parcel includes a land of any size along with any infrastructure thereon such as buildings used for any purpose such as residential or commercial.

The detection of new information with respect to the land parcel as a result of aforementioned monitoring may be based on pre-defined parameters selected from one of the following: the presence of a pre-determined key word, type of information such as text, photo or video. For example, if the information (in updatable sources of information) is a text containing words such as restaurant, bar, pub or any reference to a land parcel, such information may be designated as new information with respect to a land parcel. If the information is non-textual and in multimedia format such as video, photograph or slide shows, it may be ignored. However, comments posted with respect to the multimedia information may be monitored as described above for presence of certain keywords to help classify whether the multimedia information can be designated as new information with respect to the land parcel. The aforementioned example are only of illustration purposes and there may be possible many permutations and combinations for determining information as new information. The detection of new information as described above may be performed by algorithms available in the market or well known to the person skilled in the art. Usually, such algorithms are a part of the crawling softwares as described above and there may be required certain fine tuning of the crawling softwares to configure the pre-defined parameters for detecting new information therein.

At step 302, the new information with respect to a land parcel is processed by means of algorithms to determine the location information of the land parcel. The algorithm for determination of location information of the land parcel may vary with the type of new information such as text, photo or video. For example, if the type of new information is textual, textual analysis thereof is performed by algorithms available in the market or well known to a person skilled in the art. For example, in social networking tools, the user may post new information regarding his recent visit to a place with address or zip code or name of the place visited. Such information may be analyzed to determine the location information of the land parcel. According to a preferred embodiment, the algorithm may be configured to seek, search or harvest location information of the land using keywords in the text of new information or to analyze new information or combination thereof in publicly available databases such as yellow pages or search engines such as Google®, Bing® etc. If the type of new information in a social networking tool is a photograph along with comments with respect to the photograph posted by users of the social networking tool, the algorithm may be configured to extract metadata information of the photograph to determine the geo-tagged content of the photograph. The geo-tagged content such as (date, time and place where the photograph was taken) may be further analyzed to determine the location information of the land parcel. The user comments with respect to the photograph may also be analyzed as described above for determining location information of the land parcel. If the location information of the land parcel determined from a photograph and user comments thereof differ, further analysis or comparison of the location information may be performed to determine the extent of difference. If the location information shows no similarity or are significantly different, the algorithm may be configured to perform a pre-determined function such as treating each location information as unique with respect to two land parcels and proceed with each location information separately as described below or give the user a choice to retain one of the location information for further processing. The above example for determining the location information of the land is depicted for illustrative purposes only and there may be possible different means and ways for determining the location information of the land parcel.

At step 303, current usage of the land parcel is determined by processing the new information through algorithms well known to persons skilled in the art or available in the market. The algorithm for determining current usage of the land parcel may vary with each type of new information such as text, photo or video or a combination of the three. For example, if the type of new information with respect to the land parcel is textual, textual analysis thereof is performed by algorithms available in the market or well known to a person skilled in the art to determine the current usage of the land parcel. For example, in social networking tools, the user may post information regarding a recent visit to a place with address or zip code or name of the place visited along with some activity related keywords such as restaurant, dining, clubbing etc. Such information may be analyzed to determine the current usage of the land parcel. According to a preferred embodiment, the algorithm may be configured to seek, search or harvest current usage information of the land using keywords in the text of new information or to analyze new information or combination thereof in publicly available databases such as yellow pages or search engines such as Google®, Bing® etc. Further, the determined location information of the land parcel may also be used to determine the current usage information of the land. For example, the determined location information of the land parcel may be searched in publicly available databases such as Yellow pages of Search Engines such Google®, Bing® etc. The search result may be further analyzed for presence of any activity related keywords such as dining, eating, restaurant, drinks etc to determine the current usage of the land parcel. The above example for determining the current usage information of the land parcel is depicted for illustrative purposes only and there may be possible different means and ways for determining the current usage of the land parcel.

According to a preferred embodiment, the determination of the current usage of the land parcel at step 303 includes assigning a confidence score to the determined current usage of the land parcel. The confidence score may be assigned based on a quantum of conflict in the results obtained by processing each new information differently or by means of different algorithms. For example, if the new information is textual and processing thereof leads to a result that the current usage of the land is a restaurant whereas upon searching the determined location information in publicly available databases or processing the photo or video information leads to a result that the current usage of the land parcel is not a restaurant but is a residential complex, the confidence score assigned may be low. However, manually, upon verification by a user, the confidence score may be changed to the user's discretion.

At step 304, the location information and current usage of the land parcel are converted into pre-determined compatible format to enable querying a database of land parcels. The database contains location information of land parcels and their approved usage information. There may also contain other information regarding the land parcels. Many different types of data format conversion algorithms are available in the market and its choice depends entirely on the data format of the database.

At step 305, after the data format conversion or if the data with respect to location information of the land parcel is in a compatible format with respect to the database, the database is queried with the location information of the land parcel to determine an approved usage of the land parcel.

At step 306, the approved and current usages of the land parcel are compared and a compliance score is generated. The compliance score is indicative of the extent of deviation of current usage to the approve usage of the land parcel. The compliance score, according to a preferred embodiment, may be based on deviation of the usage of the land parcel, confidence score of current usage of the land parcel, proximity of the activity cluster center, high volume of activities, temporal variation in activity volume, diversity of users generating content etc. For example, if the approved usage of the land parcel is 'residential' and the current usage of the land parcel is determined to be 'restaurant', the compliance score assigned may be zero. This score is subject to other variables as above. For example, if the confidence score of the current usage of the land parcel is low, the compliance score may correspondingly increase. However, if the volume of activities being generated by users is high i.e. a high number of new information is detected and processed to determine that the current usage of the land parcel is restaurant, the compliance score may correspondingly decrease. Thus, the compliance score may subjected to a matrix of pre-defined variables.

At step 307, it is determined whether the generated compliance score is exceeds a pre-determined threshold. At step 308, if the compliance score exceeds a pre-defined threshold, an alarm or notification is sent to the relevant authority enabling possible relevant action. For example, the compliance score of a zero may be defined as a threshold which will trigger a notification to the relevant authority which may trigger the need of a physical verification of the land parcel for compliance.

At step 309, if the compliance score is within tolerance or acceptable limits, no action is taken.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A dynamic source of information which is regularly updated or used by users provides the latest information. Thus, the current usage of a land parcel determined from such sources provides the most up to date information which can be compared with the approved usage enabling the appropriate Government authority to take appropriate action. This would have been otherwise difficult as it would have involved a manual inspection of all land parcels. Thus, detection of violations with respect to approved land usage is quick, efficient and requires minimum human intervention. This also serves a deterrent to potential fraudsters.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What we claim:

1. A computer implemented method for verifying compliance of a land parcel to an approved usage, said method comprising:
    monitoring, by a processor of a computing system, one or more updatable sources of information to detect availability of new information with respect to the land parcel;
    processing, by the processor, the new information to determine (i) location information indicating where the parcel is located and (ii) current usage of the land parcel;
    querying, by the processor, a database storing location information, on land parcels, including approved usage information to determine an approved usage, by a local Government body, of the land parcel;
    comparing, by the processor, the current usage and the approved usage of the land parcel; and
    generating, by the processor from a result of said comparing, a numerical compliance score indicative of an extent of deviation of the current usage to the approved usage of the land parcel.

2. The method of claim 1, wherein the updatable sources of information consist of internet based social networking tools, digital maps, and land related databases.

3. The method of claim 1, wherein to detect availability of new information with respect to the land parcel is based on one or more pre-defined parameters selected from the group consisting of the presence of a pre-determined keyword, a type of the new information, and a combination thereof.

4. The method of claim 1, wherein the new information is a photograph, and wherein said processing the new information comprises:
    extracting meta data information of the photograph to identify the land parcel in the photograph and the location information thereof; and
    performing textual analysis of user comments with respect to the photograph to identify the land parcel in the photograph.

5. The method of claim 1, wherein the new information is a photograph, and wherein said processing the new information comprises:
    performing textual analysis of user comments with respect to the photograph by a scanning activity related key words.

6. The method of claim 1, wherein said querying comprises:
    converting the location information and the current usage of the land parcel into a pre-determined compatible format to enable querying the database.

7. The method of claim 1, wherein the method further comprises:
    determining, by the processor, whether the compliance score exceeds a pre-defined threshold score; and
    in response to having determined that the compliance score exceeds the pre-defined threshold score, said processor generating an alert.

8. A computing system, comprising a processor, a memory, a computer readable storage device storing program code executable by the processor via the memory to implement a method for verifying compliance of a land parcel to an approved usage, said method comprising:
    monitoring, by the processor, one or more updatable sources of information to detect availability of new information with respect to the land parcel;
    processing, by the processor, the new information to determine (i) location information indicating where the parcel is located and (ii) current usage of the land parcel;
    querying, by the processor, a database storing location information, on land parcels, including approved usage information to determine an approved usage, by a local Government body, of the land parcel;
    comparing, by the processor, the current usage and the approved usage of the land parcel; and
    generating, by the processor from a result of said comparing, a numerical compliance score indicative of an extent of deviation of the current usage to the approved usage of the land parcel.

9. The computing system of claim 8, wherein the updatable sources of information consist of interne based social networking tools, digital maps, and land related databases.

10. The computing system of claim 8, wherein to detect availability of new information with respect to the land parcel is based on one or more pre-defined parameters selected from the group consisting of the presence of a pre-determined keyword, a type of the new information, and a combination thereof.

11. The computing system of claim 8, wherein the new information is a photograph, and wherein said processing the new information comprises:
    extracting meta data information of the photograph to identify the land parcel in the photograph and the location information thereof; and
    performing textual analysis of user comments with respect to the photograph to identify the land parcel in the photograph.

12. The computing system of claim 8, wherein the new information is a photograph, and wherein said processing the new information comprises:
    performing textual analysis of user comments with respect to the photograph by a scanning activity related key words.

13. The system of claim 8, wherein said querying comprises:
    converting the location information and the current usage of the land parcel into a pre-determined compatible format to enable querying the database.

14. The computing system of claim 8, wherein the method further comprises:
    determining, by the processor, whether the compliance score exceeds a pre-defined threshold score; and
    in response to having determined that the compliance score exceeds the pre-defined threshold score, said processor generating an alert.

15. A computer program product comprising a computer readable hardware storage device having readable program code embodied therein, said program code executable by processor to implement a method, said method comprising:

monitoring, by the processor, one or more updatable sources of information to detect availability of new information with respect to the land parcel;

processing, by the processor, the new information to determine (i) location information indicating where the parcel is located and (ii) current usage of the land parcel;

querying, by the processor, a database storing location information, on land parcels, including approved usage information to determine an approved usage, by a local Government body, of the land parcel;

comparing, by the processor, the current usage and the approved usage of the land parcel; and generating, by the processor from a result of said comparing, a numerical compliance score indicative of an extent of deviation of the current usage to the approved usage of the land parcel.

16. The computer program product of claim 15, wherein the updatable sources of information consist of internet based social networking tools, digital maps, and land related databases.

17. The computer program product of claim 15, wherein to detect availability of new information with respect to the land parcel is based on one or more pre-defined parameters selected from the group consisting of the presence of a pre-determined keyword, a type of the new information, and a combination thereof.

18. The computer program product of claim 15, wherein the new information is a photograph, and wherein said processing the new information comprises:

extracting meta data information of the photograph to identify the land parcel in the photograph and the location information thereof; and performing textual analysis of user comments with respect to the photograph to identify the land parcel in the photograph.

19. The computer program product of claim 15, wherein the new information is a photograph, and wherein said processing the new information comprises:

performing textual analysis of user comments with respect to the photograph by a scanning activity related key words.

20. The computer program product of claim 15, wherein said querying comprises:

converting the location information and the current usage of the land parcel into a pre-determined compatible format to enable querying the database.

21. The computer program product of claim 17, wherein the method further comprises:

determining, by the processor, whether the compliance score exceeds a pre-defined threshold score; and in response to having determined that the compliance score exceeds the pre-defined threshold score, said processor generating an alert.

* * * * *